United States Patent [19]

Takeda et al.

[11] Patent Number: 5,730,401
[45] Date of Patent: Mar. 24, 1998

[54] CLIP

[75] Inventors: Ikuo Takeda; Kenji Yamazaki, both of Shizuoka-ken, Japan

[73] Assignee: Yazaki Corporation, Tokyo, Japan

[21] Appl. No.: 736,468

[22] Filed: Oct. 24, 1996

[30] Foreign Application Priority Data

Oct. 27, 1995 [JP] Japan ................................. 7-280789

[51] Int. Cl.$^6$ ........................................ F16L 3/22
[52] U.S. Cl. ............................ 248/69; 248/73; 248/74.3; 24/297
[58] Field of Search ........................... 248/69, 56, 73, 248/74.2, 74.3, 223.41, 229.26, 229.21, 231.31, 231.81; 24/297, 453, 458

[56] References Cited

U.S. PATENT DOCUMENTS

| D. 376,309 | 12/1996 | Takai | D8/380 |
|---|---|---|---|
| 3,310,929 | 3/1967 | Garvey | 24/297 |
| 3,776,495 | 12/1973 | Hartz et al. | 248/73 |
| 4,784,358 | 11/1988 | Kohut | 248/74.3 |
| 4,840,334 | 6/1989 | Kikuchi | 248/73 |
| 5,012,995 | 5/1991 | Ward et al. | 248/73 |
| 5,106,040 | 4/1992 | Cafmeyer et al. | 248/73 |
| 5,129,607 | 7/1992 | Satoh | 248/73 |

FOREIGN PATENT DOCUMENTS

| 63-117225 | 7/1988 | Japan . |
|---|---|---|
| 2-81255 | 6/1990 | Japan . |
| 5-83565 | 11/1993 | Japan . |

*Primary Examiner*—Leslie A. Braun
*Assistant Examiner*—Anita M. King
*Attorney, Agent, or Firm*—Finnegan, Henderson, Farabow, Garrett & Dunner, L.L.P.

[57] ABSTRACT

A clip mounted with a mounting plate having opposite walls defining a mounting groove having an opened leading end, the clip which has a clip body made of an elastic metal plate, having a V-shape portion with substantially V-shape cross section formed by folding back, so as to have two opposite inclined plate portions, the inclined plate potions having opposite slits, respectively, the opposite walls of the mounting plate inserted into the slits, respectively, when the clip body is inserted into the mounting groove from the leading end of the clip body, so that the opposite walls of the mounting groove are inserted into the slits, the mounting plate is engaged with the slits, and a slit start portion adjacent to the leading end of the V-shape potion is elastically supported by the opposite walls of the mounting plate with an elastic force of the opposite inclined plate portions; and a base having a clip-body holding portion for holding the clip body, a harness securing portion which is made of resin and to which a wire harness is secured in a state being out of contact with the clip body, and an inclination restraining portion provided in the V-shape portion of the clip body and arranged to be inserted into the mounting groove inserted into the slit to be brought into contact with the inner surface of the mounting groove so as to restrain inclination of the clip-body holding portion. Therefore, when the clip has been mounted on the mounting plate portion, engagement between the slit start portion and the opposite walls prevents shift and looseness against force acting from a direction opposite to the insertion direction, the fitting between the slit and the mounting plate portion prevents the same against force acting in a direction intersecting the mounting plate portion and the contact between the inclination restraining portion and the mounting groove prevents the same against force acting in a direction intersecting the inclined plate portion. As a result, a strong mounting state can be realized.

4 Claims, 6 Drawing Sheets

CLIP

BACKGROUND OF THE INVENTION

The present invention relates to a clip for securing a wire harness to a mounting plate portion.

A conventional clip having a structure such that a support portion adapted to a member to be attached is made of resin (refer to, for example, Japanese Utility Model Laid-Open No. 2-81255) and another clip having the support portion made of metal (refer to, for example, Japanese Utility Model Laid-Open No. 5-83565) have been known.

However, clips of the foregoing type have the structure such that the force for holding the portion to be mounted is obtained from only elastic force generated attributable to elastic deformation of the support portion. Therefore, unintentional shift or excessive looseness sometimes takes place depending upon the direction in which the force is added to the clip.

SUMMARY OF THE INVENTION

In view of the foregoing, an object of the present invention is to provide a clip capable of being free from deviation and excessive looseness against force regardless of the direction of the force.

In order to achieve the foregoing object, according to one aspect of the present invention, there is provided a clip mounted with a mounting plate having opposite walls defining a mounting groove having an opened leading end, the clip comprising: a clip body made of an elastic metal plate, having a V-shape portion with substantially V-shape cross section formed by folding back, so as to have two opposite inclined plate portions, the inclined plate potions having opposite slits, respectively, the opposite walls of the mounting plate inserted into the slits, respectively, when the clip body is inserted into the mounting groove from the leading end of the clip body, so that the opposite walls of the mounting groove are inserted into the slits, the mounting plate is engaged with the slits, and a slit start portion adjacent to the leading end of the V-shape potion is elastically supported by the opposite walls of the mounting plate with an elastic force of the opposite inclined plate portions; and a base having a clip-body holding portion for holding the clip body, a harness securing portion which is made of resin and to which a wire harness is secured in a state being out of contact with the clip body, and an inclination restraining portion provided in the V-shape portion of the clip body and ganged to be inserted into the mounting groove inserted into the slit to be brought into contact with the inner surface of the mounting groove so as to restrain inclination of the clip-body holding portion.

Since the clip according to the present invention has the structure such that the wire harness is secured to the harness securing portion made of resin in a state being out of contact with the clip body so that the secured wire harness is protected from being damaged.

To mount the clip on the mounting plate portion, the clip body is, from the leading end of the V-shape portion, inserted into the mounting groove to align the slit to the mounting plate portion. In a state where the clip according to the present invention is mounted, the mounting plate portions are engaged to the slits. The elastic force of the inclined plate portions enables the slit start portion adjacent to the leading end of the V-shape portion to be elastically supported by the opposite walls of the mounting groove. Since the inclination restraining portion is inserted into the mounting groove inserted into the slit, the engagement between the slit start portion and the opposite walls prevents shift and looseness against force acting in a direction opposite to the insertion direction, the engagement between the slits and the mounting plate portion prevents the same against force acting in a direction intersecting the mounting plate portion, and the contact between the slit and the mounting plate portion prevents the same against force acting in a direction intersecting the inclined plate portion. Therefore, a strong holding state can be realized. Therefore, a strong mounting state can be realized regardless of the direction of the force.

A structure may be employed in which the two inclined plate potions of the clip body have opposite tags projecting inwards; the clip-body holding portion of the base has a movement restraining portions formed on the two sides of the clip body in the widthwise direction of the clip body to restrain widthwise directional movement of the clip body, an insertion base portion extended into the V-shape portion of the clip body and having a leading end facing the inner surface of the leading end of the V-shape portion, and an engagement projection portion projecting from the insertion base portion for engaging the tag, the inclination restraining portion of the base is provided for the insertion base portion, and the engagement projection portion supports the inclined plate portion forcibly inserted into the mounting groove and elastically deformed.

As a result, the inclined plate portion, which has been elastically deformed, is supported by the engagement projection portion, the elastic force of the inclined plate portion can be enlarged. Thus, the force of the slit start portion for elastically supporting the opposite walls of the mounting groove can be enlarged. Therefore, a stronger mounting state can be realized.

A structure may be employed in which the clip-body holding portion of the base body has a clip-body inclination restraining portions formed on the two sides of the V-shape cross section of the clip body and arranged to be brought into contact with the inclined plate portion of the clip body so as to restrain inclination of the clip body relative to the leading end of the insertion base portion.

As a result, inclination of the clip body relative to the leading end of the insertion base portion can be restrained by the clip-body inclination restraining portion. Therefore, suspension of the engagement between the tags and the engagement projection due to the inclination of the inclined plate portion before mounting to the mounting groove can be prevented. Thus, operation for mounting the clip on the mounting plate portion can easily be performed.

A structure may be employed in which the engagement projection portion of the base has flexibility, allowed to project from the leading end side of the insertion base portion toward the base end side thereof.

Since the engagement projection which is brought into contact with the tags holds and guides the tags when the insertion base portion of the base body is inserted into the V-shape portion of the clip body, the foregoing insertion operation can easily be performed. As a result, the clip can easily be assembled.

DESCRIPTION OF THE PREFERRED EMBODIMENTS

A first embodiment of the present invention will now be described with reference to the drawings.

Figure 1:
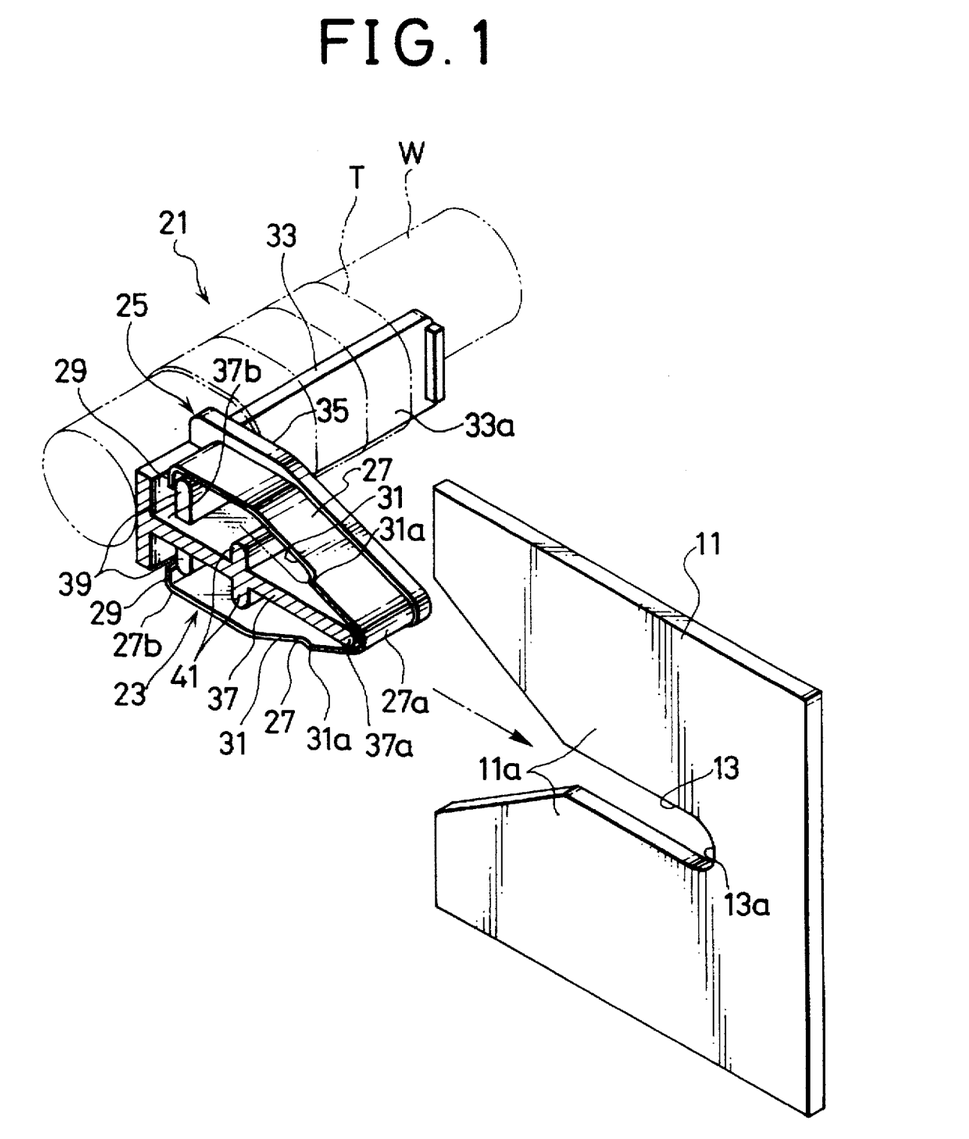
FIG. 1 is a perspective cross sectional view showing an essential portion of a clip according to a first embodiment of the present invention.
Figure 2:
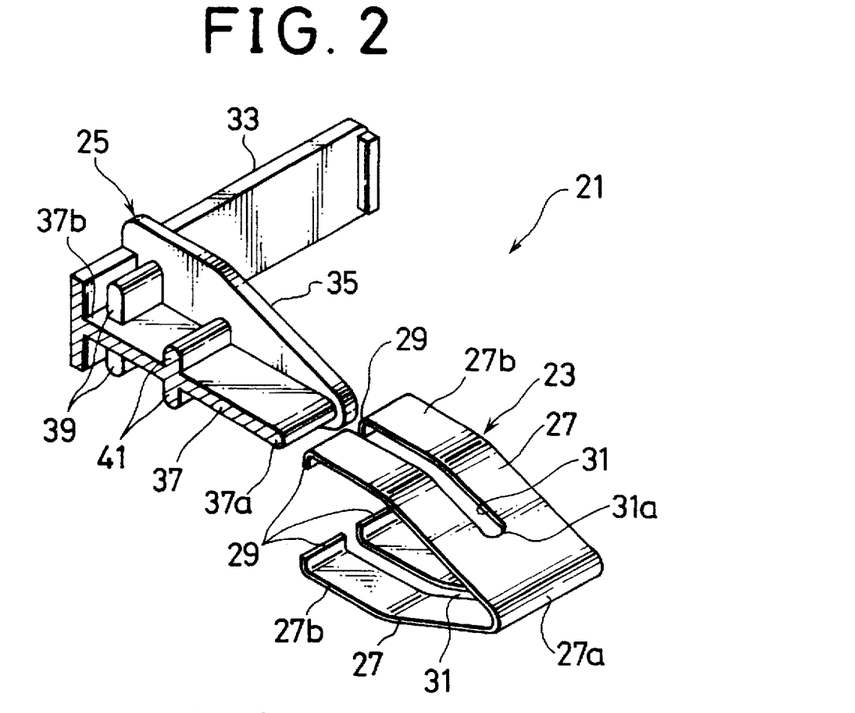
FIG. 2 is an exploded perspective view showing the clip shown in FIG. 1.
Figure 3:
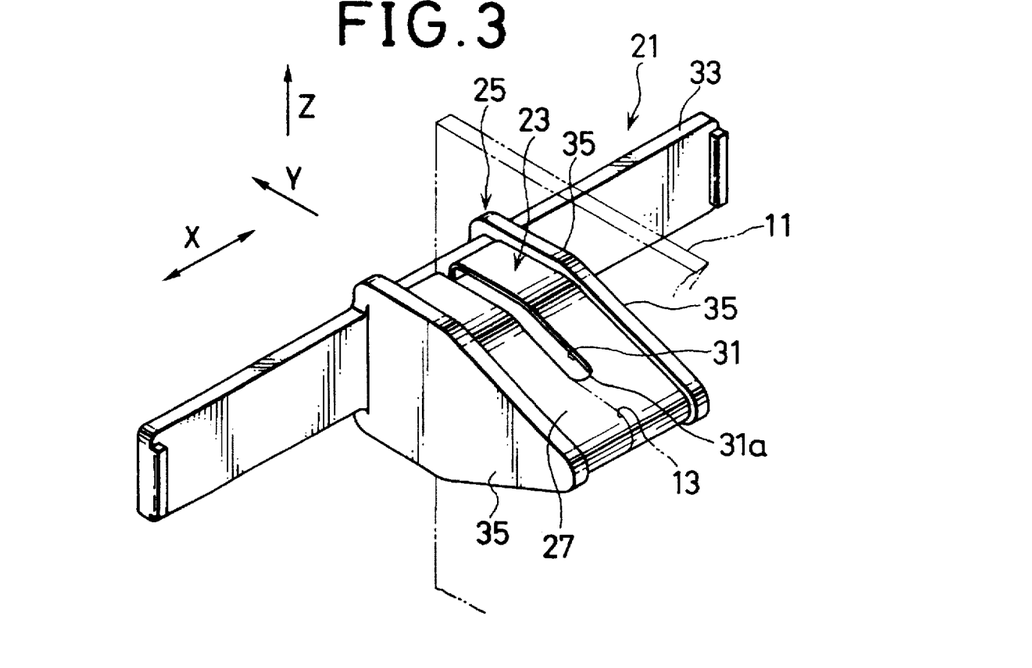
FIG. 3 is a perspective view showing an assembled clip shown in FIG. 1.
Figure 4:
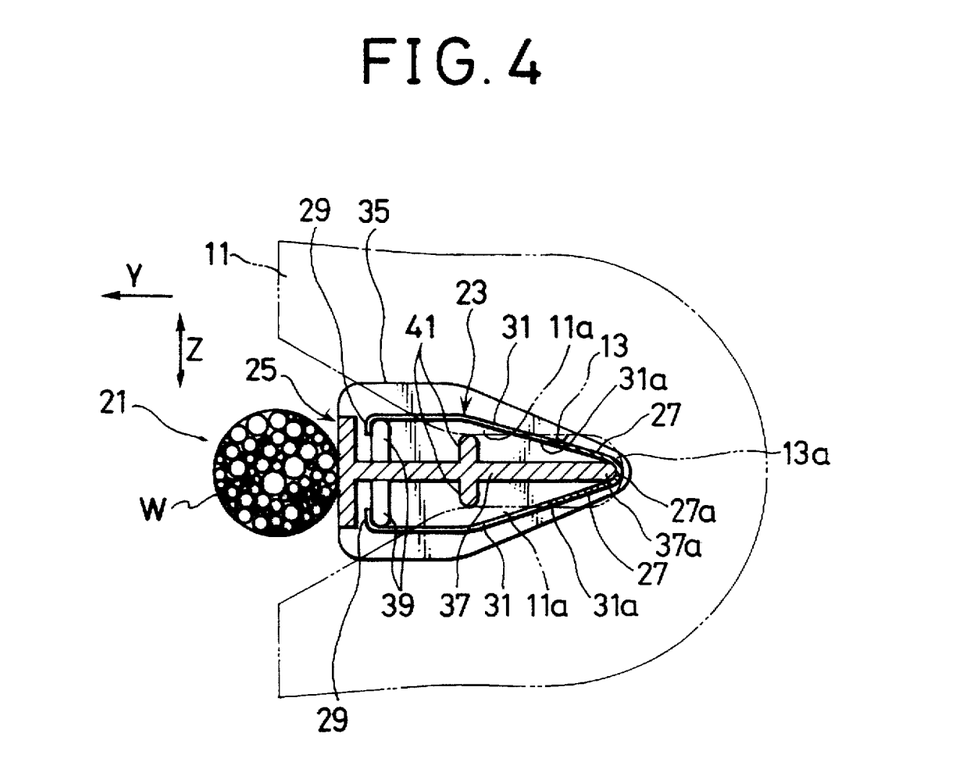
FIG. 4 is a side cross sectional view showing a state where the clip shown in FIG. 1 is mounted.

FIG. 1 is a perspective cross sectional view showing an essential portion of a clip according to the first embodiment of the present invention. FIG. 2 is an exploded perspective view showing the clip shown in FIG. 1. FIG. 3 is an assembly perspective view showing the clip shown in FIG. 1. FIG. 4 is a side cross sectional view showing a state where the clip shown in FIG. 1 has been mounted.

As shown in FIGS. 1 to 3, a clip 21 is composed of a metal clip body 23 formed by bending an elastic metal plate and a resin base 25. A mounting plate 11, on which the clip 21 is mounted, has a mounting groove 13 having an opened leading end.

The clip body 23 has a V-shape portion with substantially V-shape cross section having two opposite inclined plate portions 27 formed by folding back. The portions (opposite to the V-shape leading end) of the two inclined portions 27 adjacent to end portions 27b are formed to substantially run parallel to each other. Opposite projecting tags 29 are formed at the leading ends of the ends 27b by bending the ends 27b.

The two opposite inclined plate portions 27 have slits 31 each having a width slightly larger than the thickness of the mounting plate 11, the slits 31 extending in a direction from the V-shape leading end 27a toward the tags 29 while facing each other. When the clip body 23 is pushed inwards from the V-shape leading end 27a, opposite walls 11a of the mounting groove 13 are inserted into the slits 31 so that the mounting plate 11 is engaged. Moreover, the elastic force of the clip body 23 (two opposite inclined plate potions 27) having two inclined surfaces causes a slit start portion 31a adjacent to the V-shape leading end 27a to be held by the opposite walls 11a of the mounting groove 13.

The base 25 has a plate-like harness securing portion 33 to which a wire harness W is secured by a tape T or the like, a clip holding portion consisting of side plate portions 35 for holding the clip body 23, an insertion base portion 37, and engaging projections 39, and inclination restraining portions 41 for restraining inclination of the clip holding portion.

The side plate portions 35 and the insertion base portion 37 are substantially stood erect from a surface 33a of the harness securing portion 33.

The insertion base portion 37 is formed into a flat-plate shape having a width slightly larger than the width of the clip body 23 and a length which enables an erected base end 37b to be exposed outside over the clip body 23 when the clip body 23 is inserted from the tags 29 along the V-shape opposite surfaces of the clip body 23 to bring the leading end 37a into contact with the inside portion of the V-shape leading end 27a. That is, the insertion base portion 37 is, in the foregoing state of insertion, extended from the harness securing portion 33 to the inside portion of the V-shape space in the clip body 23 so that the leading end 37a faces the inner surface of the V-shape leading end 27a.

The side plate portions 35 are formed on the two sides of the insertion base portion 37 in the widthwise direction. The widthwise two side portions of the insertion base portion 37 are substantially perpendicularly brought into contact with the inner surfaces of the side plate portions 35 so as to be connected to one another. As a result, the side plate portions 35 are positioned on the two sides of the insertion base portion 37 in the widthwise direction when the insertion base portion 37 has been inserted into the inside space of the V-shape portion of the clip body 23 so as to restrain the widthwise movement of the clip base 23. That is, the side plate portions 35 form a movement restraining portion.

The engaging projections 39 are formed to vertically project from the right and reverse surfaces of the insertion base portion 37 adjacent to the erected base end 37b. The leading ends of the engaging projections 39 are positioned on the bent inside portions of the two tag portions 29 to engage the tag portions 29 when the leading end 37a of the insertion base portion 37 has been inserted into the inside portion of the V-shape leading end 27a of the clip body 23. When the clip body 23 (the two opposite inclined plate portions 27) having two inclined surfaces is elastically deformed inwards toward the inside portion of the V-shape portion, the engaging projections 39 are brought into contact with portions adjacent to the tags 29 of the clip body 23 having two inclined surfaces to support the same.

The inclination restraining portions 41 are formed to vertically project from the right side and the reverse side of an intermediate portion of the insertion base portion 37. The inclination restraining portions 41 are inserted into a mounting groove 13 which is inserted into the slit 31 in a state where the clip body 23 is pushed into the mounting groove 13 so as to be brought into contact with the inner surface of the mounting groove 13 to prevent inclination of the base 25.

The clip 21 is assembled in such a manner that the insertion base portion 37 of the base 25 is, along the symmetrical surfaces forming the V-shape of the clip body 23, inserted from the portion adjacent to the tags 29 into the space in the V-shape portion to position the engaging projections 39 in the inside portions of the tags 29. Moreover, the leading end 37a of the insertion base portion 37 is caused to face the inner surface of the V-shape leading end 27a of the clip body 23. In the foregoing state, movement of the clip body 23 with respect to the base 25 in the direction toward the V-shape leading end 27a is restrained attributable to the engagement between the engaging projections 39 and the tags 29. Movement of the same into a direction toward the tags 29 is restrained attributable to the contact between the leading end 37a of the insertion base portion 37 and the inner surface of the V-shape leading end 27a. Movement of the same in the widthwise direction is restrained attributable to the contact between the two side portions of the two opposite inclined plate portions 27 having two inclined surfaces and the side plate portions 35. As a result, the clip body 23 is held by the base 25. In the above-mentioned state where the clip body 23 is held by the base 25, the harness securing portion 33 is positioned apart from the clip body 23 so that the wire harness W and the tape T secured to the harness securing portion 33 are not in contact with the clip body 23.

The operation of this embodiment will now be described.

To mount the clip 21 on the mounting plate 11, the base 25 is depressed to insert the clip body 23 into the mounting groove 13 from the V-shape leading end 27a to align the slits 31 to the mounting plate 11. When the clip body 23 has been inserted into the mounting groove 13, the two opposite inclined plate portions 27 having two inclined surfaces is, as shown in FIG. 4, elastically deformed to the inside portion of the V-shape portion so that the opposite walls 11a of the mounting groove 13 are inserted into the slits 31. Moreover, the mounting plate 11 is engaged to the slits 31. The elastic force of the clip body 23 (the two opposite inclined plate portions 27) having two inclined surfaces causes the slit start portion 31a adjacent to the V-shape leading end 27a to be elastically supported by the opposite walls 11a of the mounting groove 13. Moreover, inclination restraining portions 41 are inserted into the mounting groove 13 inserted into the slits 31 so that the state of mounting is realized.

The thus-mounted clip 21 is strongly held against force in the direction opposite to the insertion direction (in a direction indicated by an arrow Y shown in FIGS. 3 and 4) attributable to the engagement between the slit start portion 31a and the opposite walls 11a and against force in a direction (in a direction indicated by an arrow X shown in FIG. 3) intersecting the mounting plate 11 attributable to the engagement between the slits 31 and the mounting plate 11.

The inclination restraining portion 41 and the inner surface of the mounting groove 13 are brought into contact with each other so that inclination of the base 25 against force in a direction (in a direction indicated by an arrow Z shown in FIGS. 3 and 4) intersecting the two opposite inclined plate portions 27 having two inclined surfaces is restrained. As a result, the clip 21 is strongly held by the mounting plate 11.

That is, the above-mentioned clip 21 enables a strong state of mounting to be realized without shift or looseness against force applied regardless of the direction.

Since the resin harness securing portion 33, in which the wire harness W is secured to the clip body 23 in a non-contact manner, is provided, the wire harness W and the tape T can be protected from being damaged.

Since a portion adjacent to the tags 29 having two inclined surfaces, which has been elastically deformed, is supported by the engaging projections 39, the elastic force generated owning to the clip body 23 having two inclined surfaces can be enlarged. As a result, the force of the mounting groove 13 for elastically supporting the slit start portion 31a with respect to the opposite walls 11a can be enlarged. Thus, a stronger state of mounting can be realized.

Note that the inclination restraining portion 41 and the inner surface of the mounting groove 13 are formed extremely adjacent to each other to immediately bring the inclination restraining portion 41 and the mounting groove 13 into contact with each other so that inclination of the base 25 is furthermore reliably restrained. As a result, generation of looseness of the clip 21 with respect to the mounting plate 11 can reliably be restrained.

A second embodiment of the present invention will now be described with reference to FIGS. 5 to 10.

Figure 5:
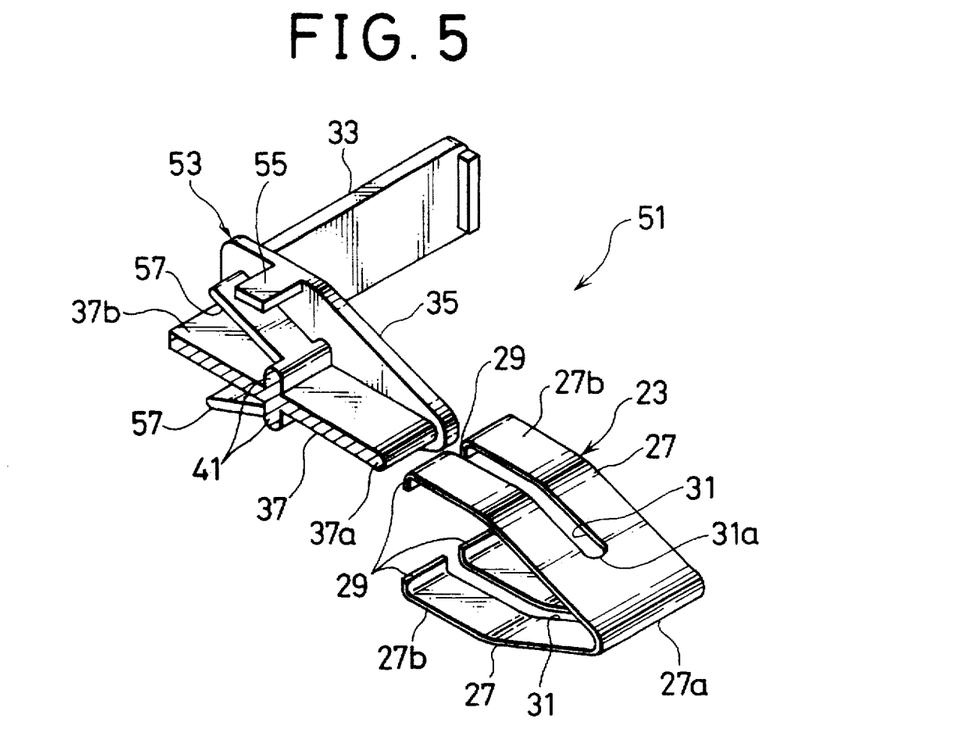
FIG. 5 is an exploded perspective view showing a clip according to a second embodiment of the present invention.
Figure 6:
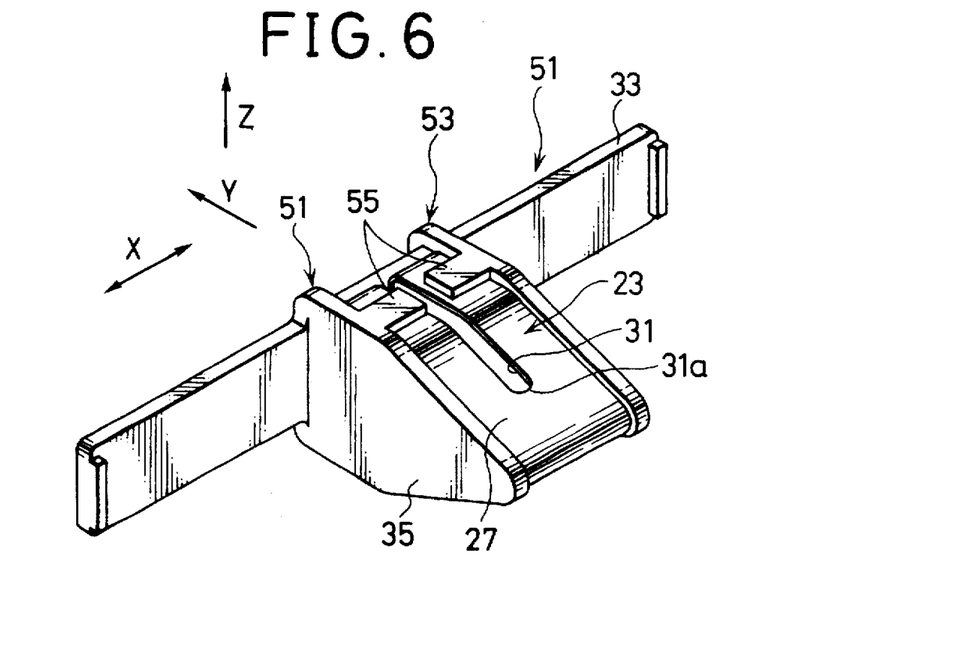
FIG. 6 is a perspective view showing an assembled clip shown in FIG. 5.
Figure 7:
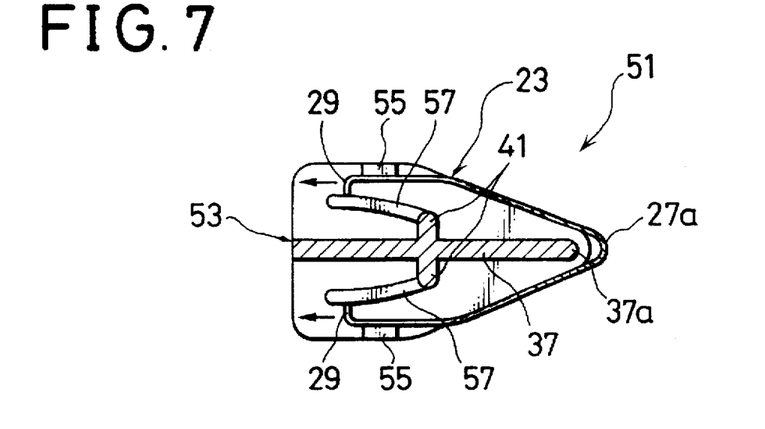
FIG. 7 is a cross sectional view showing an intermediate moment during an operation for assembling the clip shown in FIG. 5.
Figure 8:
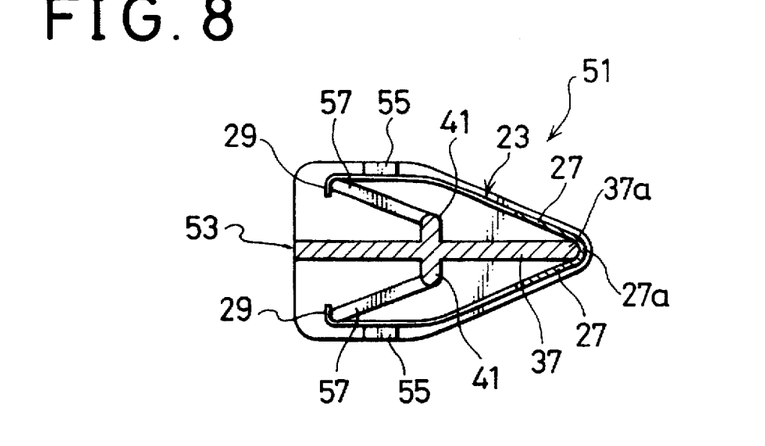
FIG. 8 is a cross sectional view showing an assembled clip shown in FIG. 5.
Figure 9:
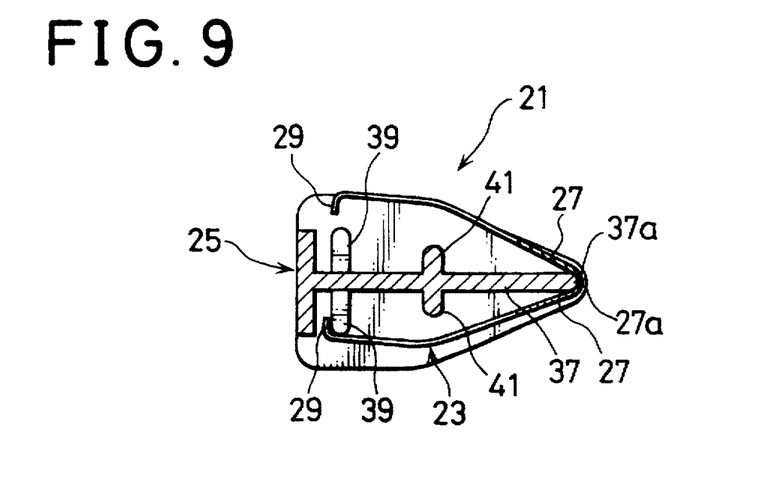
FIG. 9 is a cross sectional view showing a clip body of the clip shown in FIG. 1 in an inclined state.
Figure 10:
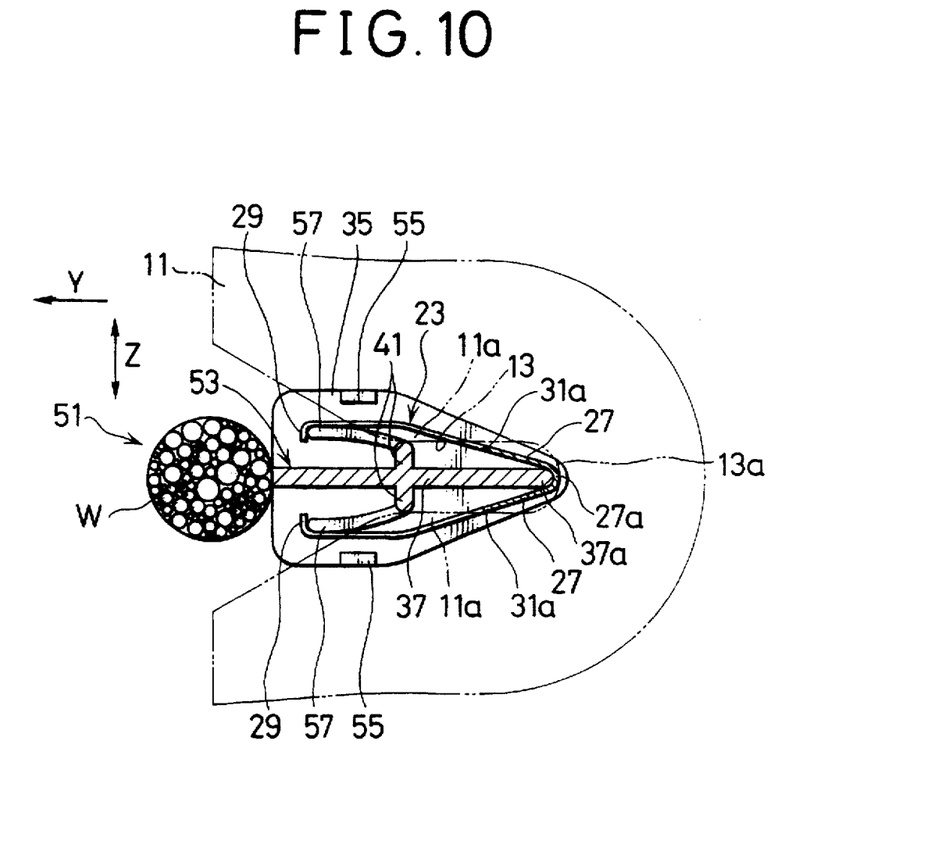
FIG. 10 is a side cross sectional view showing a state where the clip shown in FIG. 5 has been mounted.

FIG. 5 is an exploded perspective view showing a clip according to this embodiment. FIG. 6 is a perspective view showing the clip shown in FIG. 5 in an assembled state. FIG. 7 is a cross sectional view showing a state where a process for assembling the clip shown in FIG. 5 is being performed. FIG. 8 is a cress sectional view showing a state where the clip shown in FIG. 5 has been assembled. FIG. 9 is a cross sectional view showing a state where the clip body of the clip shown in FIG. 1 is inclined. FIG. 10 is a side cress sectional view showing a state where the clip shown in FIG. 5 has been mounted. Note that similar elements to those according to the first embodiment are given the same reference numerals and the similar elements are omitted from description.

As shown in FIGS. 5 and 6, this embodiment has a structure such that a clip-body inclination restraining portion 55 forming the clip-body holding portion together with the side plate portions 35 and the insertion base portion 37 according to the first embodiment is provided; and an engaging projection 57 having flexibility is provided.

The clip-body inclination restraining portion 55 is formed into a plate-like shape projecting from the side plate portions 35 so as to be positioned on the two side portions of the V-shape cross section of the clip body 23. The clip-body inclination restraining portion 55 being brought into contact with the clip body 23 restrains inclination of the clip body 23 substantially relative to the leading end 37a of the insertion base portion 37.

The engaging projection 57 is provided to diagonally project from the inclination restraining portion 41 (a position adjacent to the leading end 37a of the insertion base portion 37) toward the base end 37b so as to be in contact with the leading end of the V-shape portion of the tags 29 of the clip body 23.

According to this embodiment, the engaging projection 57, which is brought into contact with the tags 29, is deflected inwards when the insertion base portion 37 of the base 25 is inserted into the portion in the V-shape portion of the clip body 23 as shown in FIG. 7 so as to guide the tags 29, which slide on the inner surface of the clip-body inclination restraining portion 55. The foregoing insertion operation can easily be performed so that the operation for assembling the clip 51 is performed easily.

As shown in FIG. 9, the first embodiment has a possibility that the clip body 23 is inclined substantially relative to the leading end 37a of the insertion base portion 37 before the clip 21 is mounted on the mounting plate 11 (see FIG. 1) and, therefore, the engagement between the tags 29 and the engaging projection 57 are suspended to cause the clip body 23 to be separated from the base 25. As a result, an attention must be paid to prevent inclination of the clip body 23 when the clip 21 is mounted on the mounting plate 11. Thus, the mounting operation is complicated excessively.

On the other hand, this embodiment has the structure such that inclination of the clip body 23 relative to the leading end 37a of the insertion base portion 37 is, as shown in FIG. 8, restrained by the clip-body inclination restraining portion 55 in the assembled state where the insertion base portion 37 has been inserted into the V-shape portion of the clip body 23. Therefore, the clip body 23 having two inclined surfaces is inclined before mounted to the mounting plate 11 (see FIG. 10). As a result, the engagement between the tags 29 and the engaging projection 57 cannot easily be suspended. Therefore, separation of the clip body 23 from the base 25 can reliably be prevented. Hence, the clip 51 can easily be mounted on the mounting plate 11.

Even if the clip is the clip 21 having the engaging projection 39, which is not a flexible element, provision of the clip-body inclination restraining portion 55 enables the clip 21 to easily be mounted on the mounting plate 11, similarly to the first embodiment.

Moreover, a strong state of mounting against force acting from any direction (directions indicated by arrows X, Y and Z shown in FIG. 6 or FIG. 10) can be realized. As a result, the wire harness W can be protected from being damaged, similarly to the first embodiment.

What is claimed is:

1. A clip mounted with a mounting plate having opposite walls defining a mounting groove having an opened leading end, said clip comprising:

a clip body made of an elastic metal plate, having a V-shape portion with substantially V-shape cross section formed by folding back, so as to have two opposite inclined plate portions, said inclined plate potions having opposite slits, respectively, said opposite walls of said mounting plate inserted into said slits, respectively, when said clip body is inserted into said mounting groove from a leading end of said clip body, so that said opposite walls of said mounting plate are inserted into said slits, said mounting plate is engaged with said slits, and a slit start portion adjacent to the leading end of said V-shape portion is elastically supported by said opposite walls of said mounting plate with an elastic force of said opposite inclined plate portions; and a base having a clip-body holding portion for holding said clip body, a harness securing portion which is made of resin and to which a wire harness is adapted to be secured in a state being out of contact with said clip body, and an inclination restraining portion provided in said V-shape portion of said clip body and arranged to be inserted into said mounting groove inserted into said slits to be brought into contact with an inner surface of said mounting groove so as to restrain inclination of said clip-body holding portion.

2. The clip according to claim 1, wherein said two inclined plate portions of said clip body have opposite tags projecting inwards;

said clip-body holding portion of said base has movement restraining portions formed on two sides of said clip body in the widthwise direction of said clip body to restrain widthwise directional movement of said clip body, an insertion base portion extended into said V-shape portion of said clip body and having a leading end facing an inner surface of the leading end of said V-shape portion, and an engagement projection portion projecting from said insertion base portion for engaging said tags, said inclination restraining portion of said base is provided for said insertion base portion, and said engagement projection portion supports said inclined plate portion forcibly inserted into said mounting groove and elastically deformed.

3. A clip according to claim 2, wherein said clip-body holding portion of said base has a clip-body inclination restraining portions formed on the two sides of said V-shape cross section of said clip body and arranged to be brought into contact with said inclined plate portion of said clip body so as to restrain inclination of said clip body relative to the leading end of said insertion base portion.

4. The clip according to claim 3, wherein said engagement projection portion of said base has flexibility, allowed to project from the leading end of said insertion base portion toward a base end side thereof.

* * * * *